United States Patent
Sheldon

(10) Patent No.: US 8,186,775 B2
(45) Date of Patent: May 29, 2012

(54) ERGONOMICALLY IMPROVED ARM PORTAL AND PASS BOX ASSEMBLY

(76) Inventor: Dan M. Sheldon, Cornelius, OR (US)

( * ) Notice: Subject to any disclaimer, the term of this patent is extended or adjusted under 35 U.S.C. 154(b) by 155 days.

(21) Appl. No.: 12/783,420

(22) Filed: May 19, 2010

(65) Prior Publication Data

US 2011/0285257 A1    Nov. 24, 2011

(51) Int. Cl.
*A61G 11/00*    (2006.01)
*C12M 1/00*    (2006.01)

(52) U.S. Cl. ............... 312/1; 435/303.1; 435/809

(58) Field of Classification Search ... 312/1; 435/303.1, 435/303.2, 809
See application file for complete search history.

(56) References Cited

U.S. PATENT DOCUMENTS

| | | | | |
|---|---|---|---|---|
| 2,695,605 A * | 11/1954 | Gibbon | .......................... | 600/22 |
| 3,084,684 A * | 4/1963 | Saunders | .......................... | 312/1 |
| 3,490,443 A * | 1/1970 | Decupper | .......................... | 601/11 |
| 3,498,687 A * | 3/1970 | Diccianni | .......................... | 312/1 |
| 3,547,505 A * | 12/1970 | Ott et al. | | |
| 4,111,753 A * | 9/1978 | Folsom et al. | .................... | 435/3 |
| 4,626,291 A * | 12/1986 | Natale | ............................. | 134/21 |
| 4,773,392 A * | 9/1988 | Koch | ................................ | 600/22 |
| 4,783,129 A * | 11/1988 | Jacobson | .......................... | 312/1 |
| 4,842,347 A * | 6/1989 | Jacobson | .......................... | 312/1 |
| 4,876,773 A * | 10/1989 | Wade | ............................. | 27/23.1 |
| 5,062,871 A * | 11/1991 | Lemon, III | .................... | 55/385.2 |
| 5,095,925 A * | 3/1992 | Elledge et al. | ................... | 134/61 |
| 5,205,624 A * | 4/1993 | Martell et al. | .................... | 312/1 |
| 5,316,541 A * | 5/1994 | Fischer | .......................... | 600/21 |
| 5,316,733 A * | 5/1994 | Rune et al. | .................... | 422/565 |
| 5,342,121 A * | 8/1994 | Koria | ............................. | 312/1 |
| 5,520,449 A * | 5/1996 | Klak | ................................ | 312/1 |
| 5,536,077 A * | 7/1996 | Ross | ................................ | 312/1 |
| 5,553,933 A * | 9/1996 | Ross | ................................ | 312/1 |
| 5,785,396 A * | 7/1998 | Israel | ............................. | 312/1 |
| 5,860,711 A * | 1/1999 | Kronberg et al. | ................ | 312/1 |
| 5,861,305 A | 1/1999 | Silley | | |
| 6,100,083 A | 8/2000 | Coy | | |
| 6,241,328 B1 * | 6/2001 | Ziff | ................................ | 312/1 |
| 6,293,902 B1 * | 9/2001 | Hundertmark et al. | ......... | 600/22 |
| 6,708,697 B1 * | 3/2004 | Ziff | ................................ | 132/73 |
| 6,793,617 B2 * | 9/2004 | Ford et al. | ....................... | 600/21 |
| 6,974,197 B1 * | 12/2005 | Henry et al. | ..................... | 312/1 |
| 7,325,890 B2 * | 2/2008 | Oyama et al. | .................... | 312/1 |
| D627,900 S * | 11/2010 | Layman | ....................... | D24/234 |
| D645,976 S * | 9/2011 | Murray et al. | ............... | D24/232 |

* cited by examiner

*Primary Examiner* — Darnell Jayne
*Assistant Examiner* — Kimberley S Wright
(74) *Attorney, Agent, or Firm* — Mark S. Hubert

(57) ABSTRACT

An arm portal for ingress and egress within an enclosed, controlled environment, such as an incubator, employs asymmetric orifices to obtain superior arm mobility. The hand/arm portals along with the pass box can be manufactured into a one-piece injection molded assembly that is easily attached to the front face of an enclosed anaerobic environment.

14 Claims, 10 Drawing Sheets

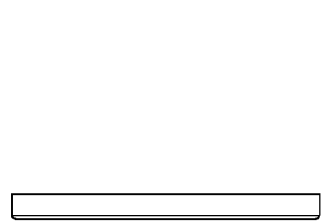
FIG. 13
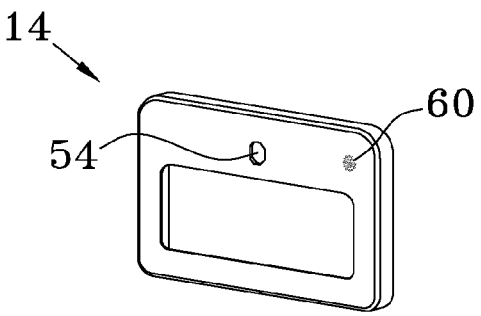
FIG. 14
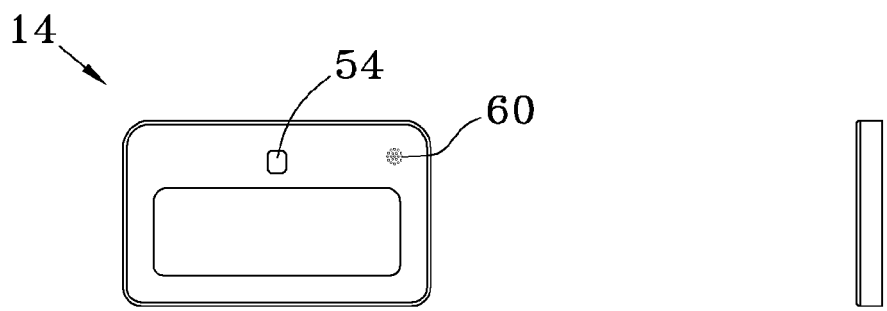
FIG. 15
FIG. 16
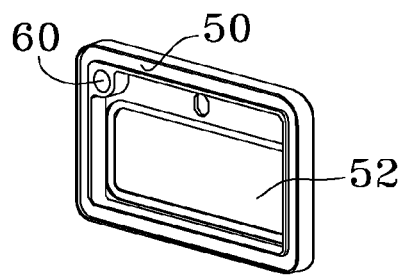
FIG. 17

ERGONOMICALLY IMPROVED ARM PORTAL AND PASS BOX ASSEMBLY

BACKGROUND OF THE INVENTION

The present invention relates generally to scientific research and medical equipment. More particularly, the present invention relates to chambers which are provided with a controlled interior atmosphere such as an anaerobic incubator.

Various designs for anaerobic incubators exist, but all at the very least share these features: an enclosure with means for inducing and maintaining a prescribed environment; hand/arm access portals for manipulation of items within the controlled environment; and a pass box for moving samples in an out of the controlled environment. Prior art has dictated two designs for the shape of hand/arm portals, one design being circular as shown and described in U.S. Pat. No. 6,100,083 and the second design being best described as an elongated circle as shown and described in U.S. Pat. No. 5,861,305. In the '305 patent, the hand/arm portals are vertically elongated as compared to the circular portals, with their tops and bottoms remaining curved but with the sides only displaying a slight curvature.

Both the circular and elongated circular designs limit the scientist's movement within the controlled environment. Often samples are stored in the back of the enclosure or are introduced to the controlled environment via side pass boxes. Should the scientist or technician be small in stature and as such have a smaller reach, obtaining samples in the back of the enclosure is extremely difficult. Both the circular and elongated circular portals do not allow the scientist to get his/her upper arm and shoulder into the enclosure. Additionally, for anaerobic incubators where the pass boxes are located on the side of the incubator, all scientists have mobility issues, because human elbows are not designed to bend away from the body (i.e. backwards). Moving samples to/from side pass boxes or enclosures is extremely awkward. Due to the shape of the hand/arm portals it is extremely difficult to maneuver one's left arm to reach a sample contained within a pass box on the right-hand side of the enclosure, because the distance is simply too great; while reaching the sample with one's right-hand is also difficult due to the elbow's inability to move in backward.

SUMMARY OF THE INVENTION

In accordance with the invention, superior arm mobility within the anaerobic environment is achieved with a novel geometry for the hand/arm portals that arises from the spatial ergonomics of arm movement within the enclosed environment under standard conditions. Additionally, the hand/arm portals along with the pass box can be manufactured into a one-piece injection molded assembly that is easily attached to front face of the enclosed anaerobic environment. The combination of these novel elements allows a superior working environment.

BRIEF DESCRIPTION OF THE DRAWINGS

FIG. 13 is a top view of the front seal plate of the pass box;

FIG. 14 is a front perspective view of the front seal plate of the pass box;

FIG. 15 is a front view of the front seal plate of the pass box;

FIG. 16 is a right side view of the front seal plate of the pass box; it should be noted that the left side view is a mirror image of the right side view;

FIG. 17 is a back perspective view of the front seal plate of the pass box;

DETAILED DESCRIPTION

Figure 1:
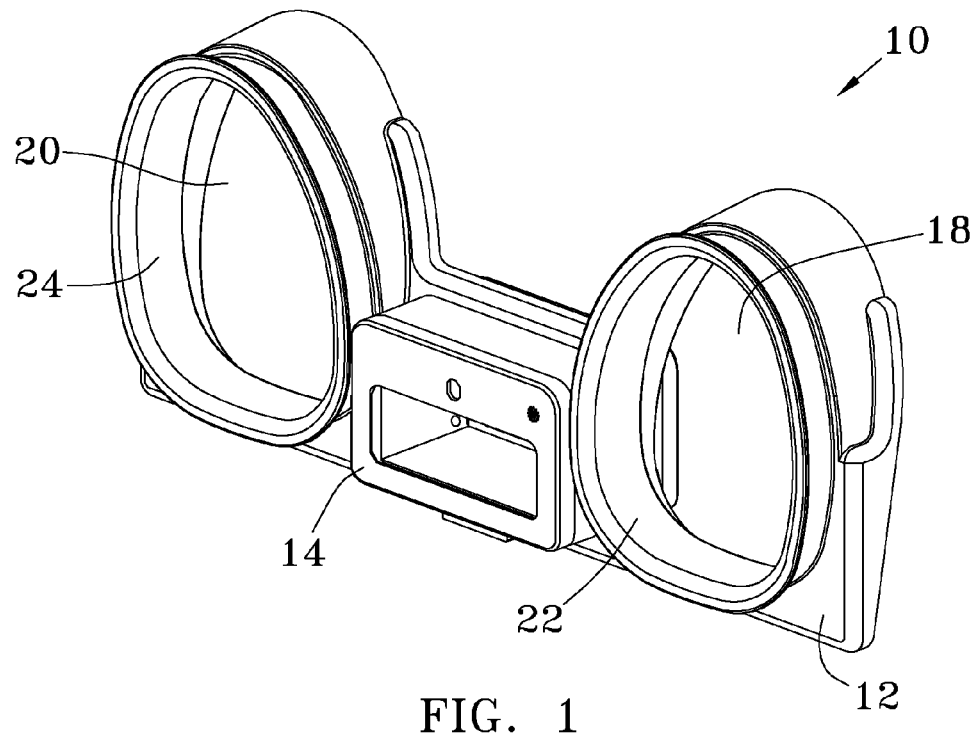
FIG. 1 is a front perspective view of the arm portal and pass box assembly.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

Figure 2:
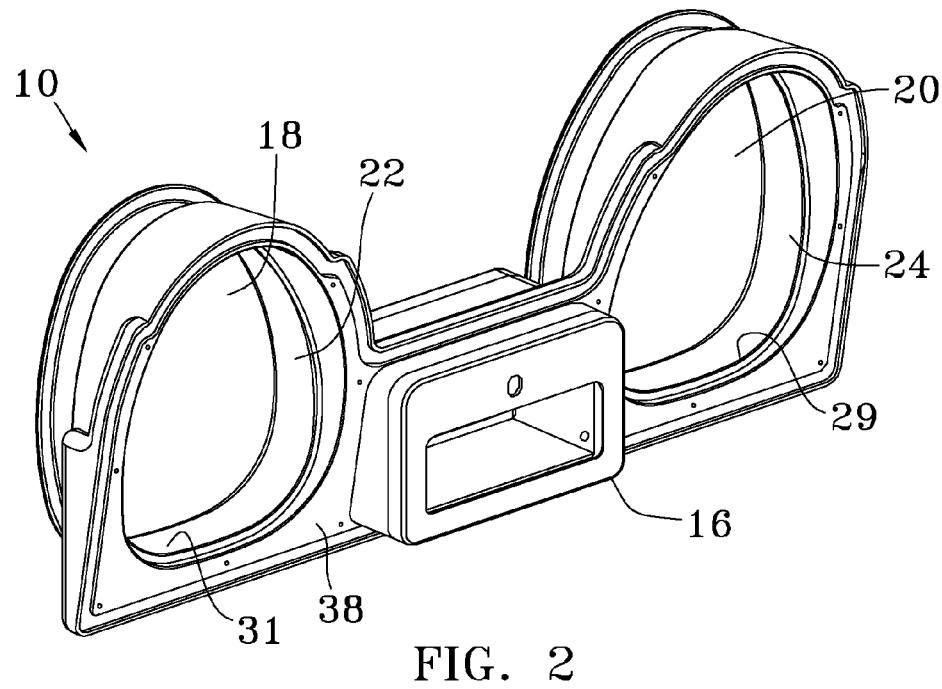
FIG. 2 is a back perspective view of the arm portal and pass box assembly.
Figure 3:
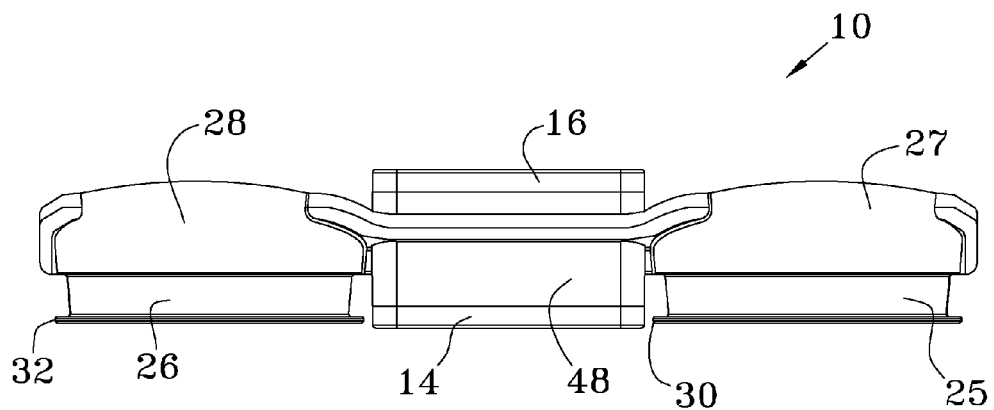
FIG. 3 is a top view of the arm portal and pass box assembly.
Figure 4:
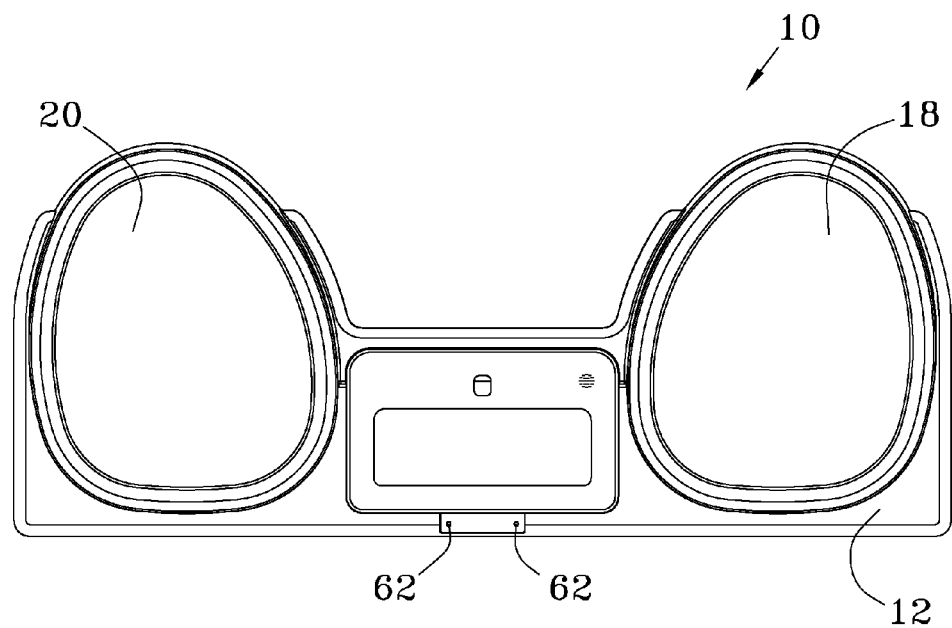
FIG. 4 is a front view of the arm portal and pass box assembly.
Figure 5:
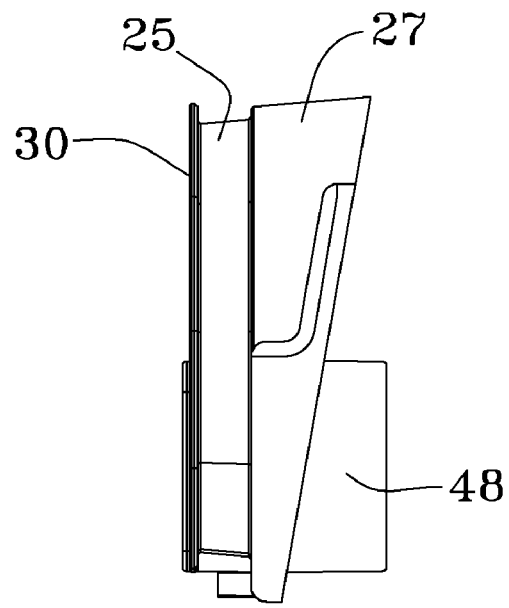
FIG. 5 is a right side view of the arm portal and pass box assembly.
Figure 6:
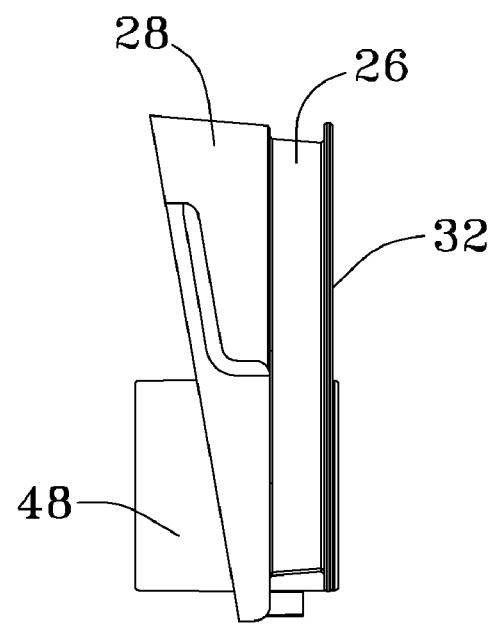
FIG. 6 is a left side view of the arm portal and pass box assembly.

Looking at FIGS. 1 and 2 the arm portal and pass box assembly 10 is comprised of a unitary or monolithic portal body 12, a pass box front seal plate assembly 14 and a pass box rear seal plate assembly 16. The portal body 12 has a left portal 20 and a right portal 18 formed therethrough. These portals are defined by a stepped left portal interior wall 24 and a stepped right portal interior wall 22. Looking at FIG. 2, it can be seen that the rear or inner section of these interior walls 24 and 22 are stepped into a larger diameter that follows the same axial profile as the front or outer inner wall's axial profile. This step serves to establish a left plug seal face 29 and a right plug seal face 31 that acts as a raised flange for the elastomeric seal of a plug plate that may optionally be inserted from the inside of the chamber.

Turning now to FIGS. 3-6, each portal, 20 and 18, is made up of two conjoined rings. The left portal 20 is made of a left single walled outer ring 26 and an enclosed left double walled inner ring 28. The right portal 18 is made of a right single walled outer ring 25 and an enclosed right double walled inner ring 27. The exterior side of the left outer ring 26 has a slight outward rear bevel away from its midpoint and has left front flange 32 formed about its front edge. The exterior side of the right outer ring 25 has a slight outward rear bevel away from its midpoint and has left front flange 30 formed about its front edge.

These single walled outer rings 25 and 26 have a uniform depth The side walls of the inner rings 28 and 27 do not have a uniform depth but rather are angled such that the depth of the inner rings 28 and 27 increases from the bottom of the ring to the top of the ring. Only the back edge of the inner rings 28 and 27 has a taper. In this manner the front transparent panel of the incubator hood may be angled away from the user's head to accommodate increased visibility. The inner rings 28 and 27 and the outer rings 26 and 25 have the identical geometric profiles in axial cross section but the outer rings 26 and 25 have a smaller diameter. The two rings transition together at the non-tapered front edge of the inner ring and the smaller diameter rear edge of the outer ring. This is where the left plug seal face 29 and right plug seal face 31 are formed. The space created on the exterior surface of the outer rings 26 and 25 between their front flanges and the transition interface to the inner rings 28 and 27 forms a left glove recess 41, see FIG. 8, and a right glove recess 43 about the periphery of the outer rings 26 and 25. This allows the retention of an elastic glove assemblies and sealing belt.

Figure 12:
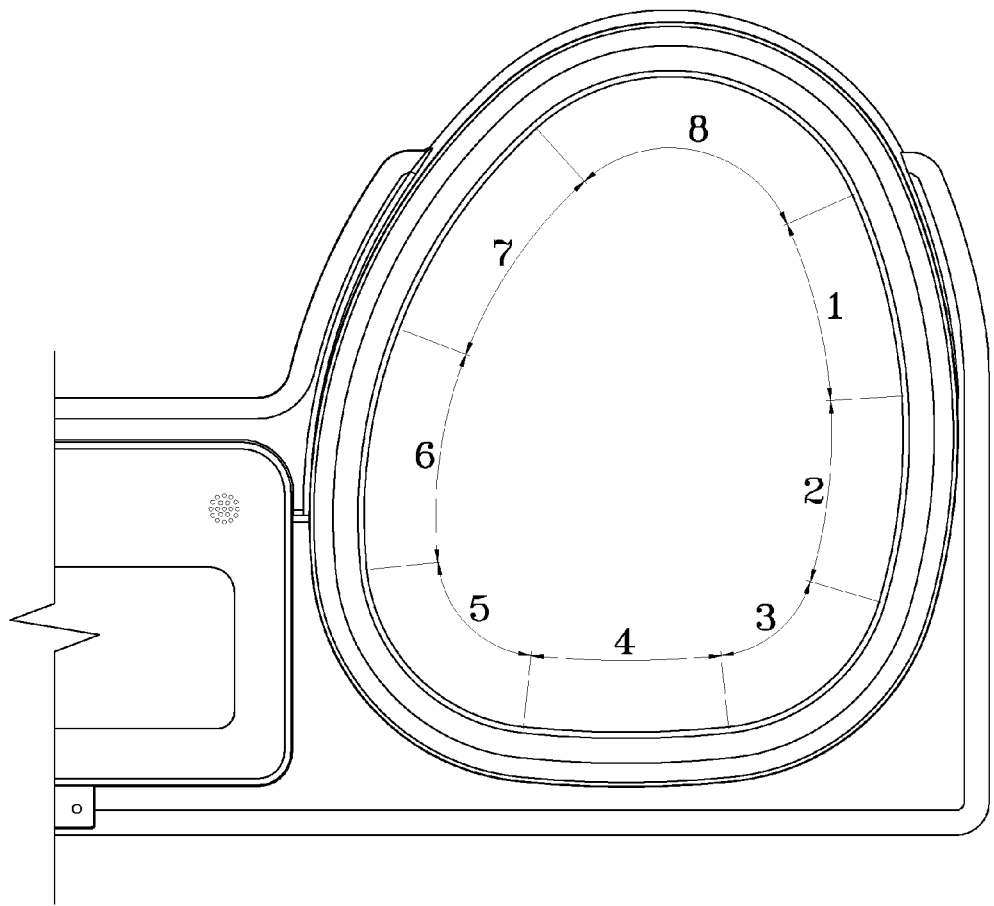
FIG. 12 in a partial enlarged view of the right-hand side of the arm portal and pass box assembly.
Figure 18:
FIG. 18 is a top view of the back seal plate of the pass box.
Figure 19:
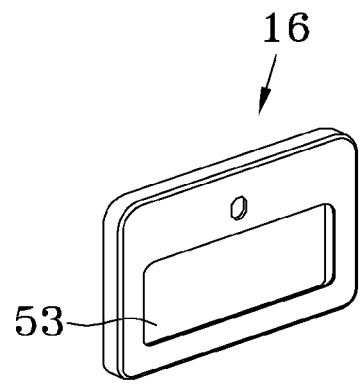
FIG. 19 is a front perspective view of the back seal plate of the pass box
Figure 20:
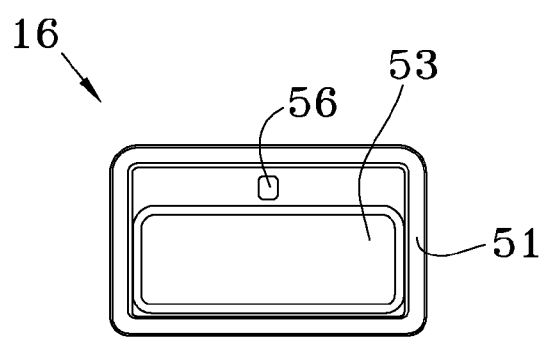
FIG. 20 is a back view of the back seal plate of the pass box.
Figure 21:
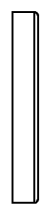
FIG. 21 is a right side view of the back seal plate of the pass box; it should be noted that the left side view is a mirror image of the right side view
Figure 22:
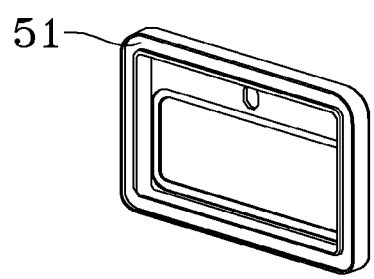
FIG. 22 is a back perspective view of the back seal plate of the pass box.

The axial cross sectional profile of all sections of the portals have a complex geometric configuration made up of several sections of different diameter circles. Each portal, 20 and 18, has no axis of symmetry. This is best illustrated in FIG. 12 and explained in the accompanying table. The right portal 18 configuration only will be discussed. The left portal 20 is a mirror image of the right portal 18. Looking at FIG. 12, it can see that the arc segments of right portal 18 have been numbered 1-8, beginning approximately at the two o'clock position, and progressing clockwise around right portal 18 and are described in terms of their arc length in degrees and their root circle's radius in arbitrary units.

| Right Portal Configuration | | |
| --- | --- | --- |
| Arc Segment | Arc Length (degrees*) | Root Circle Radius (arbitrary units) |
| 1 | 20 | 8.889 |
| 2 | 20 | 7.888 |
| 3 | 68 | 2.638 |
| 4 | 12 | 14.889 |
| 5 | 78 | 2.638 |
| 6 | 27 | 8.889 |
| 7 | 27 | 7.888 |
| 8 | 108 | 2.988 |

*The number of degrees of each arc segment is measured from the center of the root circle for that specific arc segment not from the centroid of the portal configuration.

Figure 7:
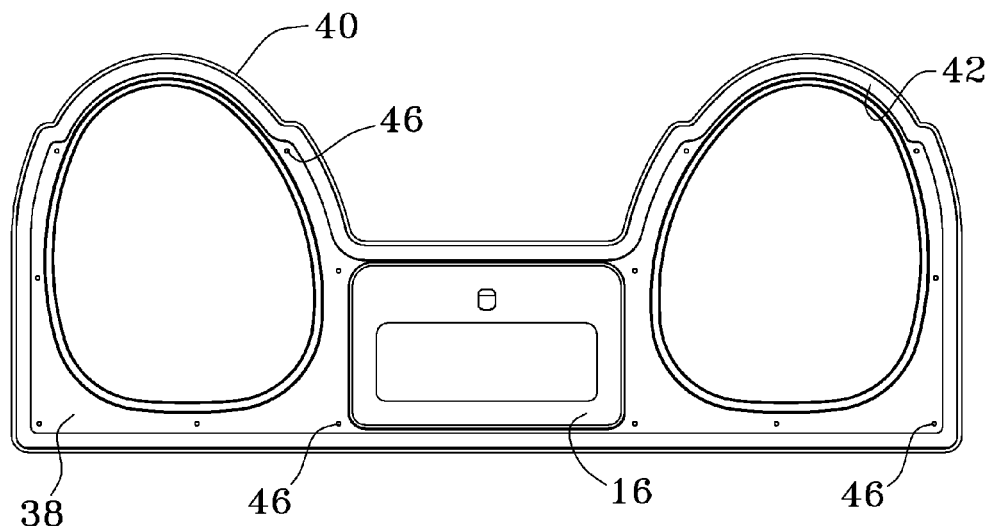
FIG. 7 is a back view of the arm portal and pass box assembly.
Figure 8:
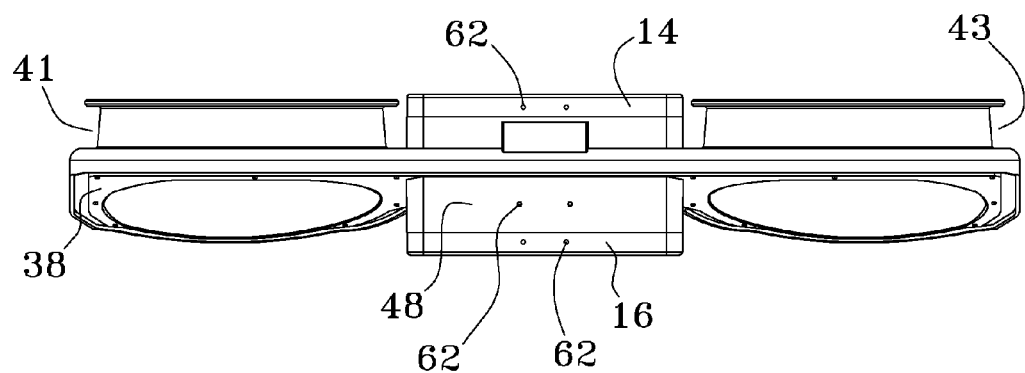
FIG. 8 is a bottom view of the arm portal and pass box assembly.

As can be seen the portals are mirror images of each other taken about a vertical line passing through the midpoint of the portal body 12. Equidistant between the two portals is a pass box section 48, which is illustrated in FIGS. 7-8. All of these elements are held in their spaced configurations by the connection flange portion 38 of the portal body 12. The flanged portion 38 extends from the rear exterior back edge 40 of the double walled inner rings 28 and 27 and spans the area around the pass box section 48. This makes a generally planar surface for the placement of a sealing gasket between the portal body 12 and the transparent front panel 44 of the incubator hood. Around the entire flanged portion is formed an O ring groove 42 for the retention of a second sealing mechanism (preferably a compressible O-ring.)

The pass box section 48 is a generally rectangular double walled cylinder open on either end. A pass box front seal plate assembly 14 and a pass box rear seal plate assembly 16 are used to seal this chamber from both the outside ambient air and the anaerobic environment within the hood. The front seal plate 14 has an front elastomeric seal groove 50 formed about its inside perimeter and a front transparent panel 52 mechanically affixed about a viewing orifice formed there through (FIGS. 13-17). The rear seal plate 16 has an rear elastomeric seal groove 51 formed about its inside perimeter and a transparent panel 53 mechanically affixed about a viewing orifice formed there through. There is a first and second lock mechanism orifice 54 and 56 formed through the pass box front seal plate assembly 14 and a pass box rear seal plate assembly 16.

To vent out purge gas, when it is introduced into the pass box 48, there resides a small group of venting orifices 60 on the front seal plate 14 in order to remove any oxygen from the pass box 48 prior to opening the back seal plate assembly 16 to transfer working material into the incubator hood.

FIGS. 7 and 8 illustrate the mechanical connection orifices 46 formed through the flanged portion 38 between the exterior edge 40 of the outer wall of the double walled inner rings 22 and 24 and the O ring groove 42 for the attachment of the portal body 12 to the chamber.

Figure 9:
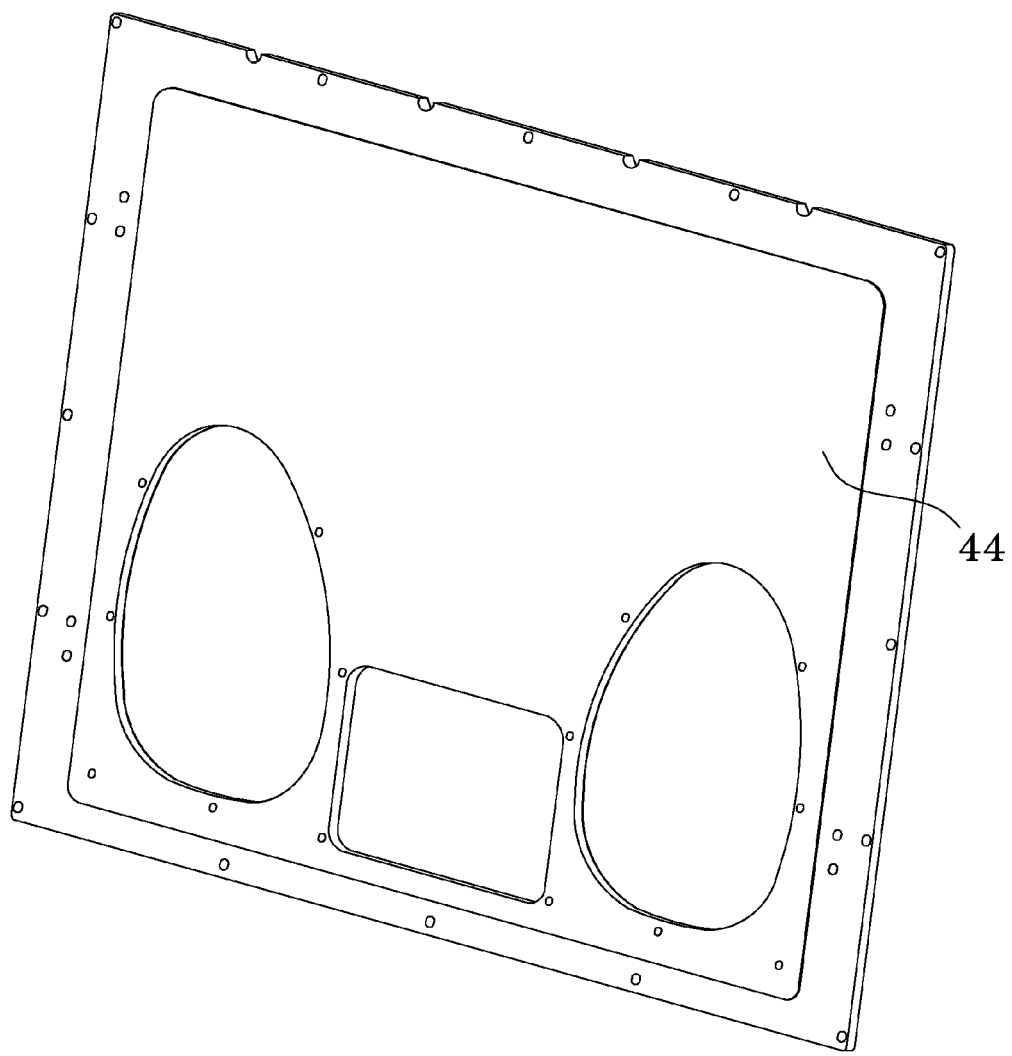
FIG. 9 is a perspective view of the front panel of an incubator hood.
Figure 10:
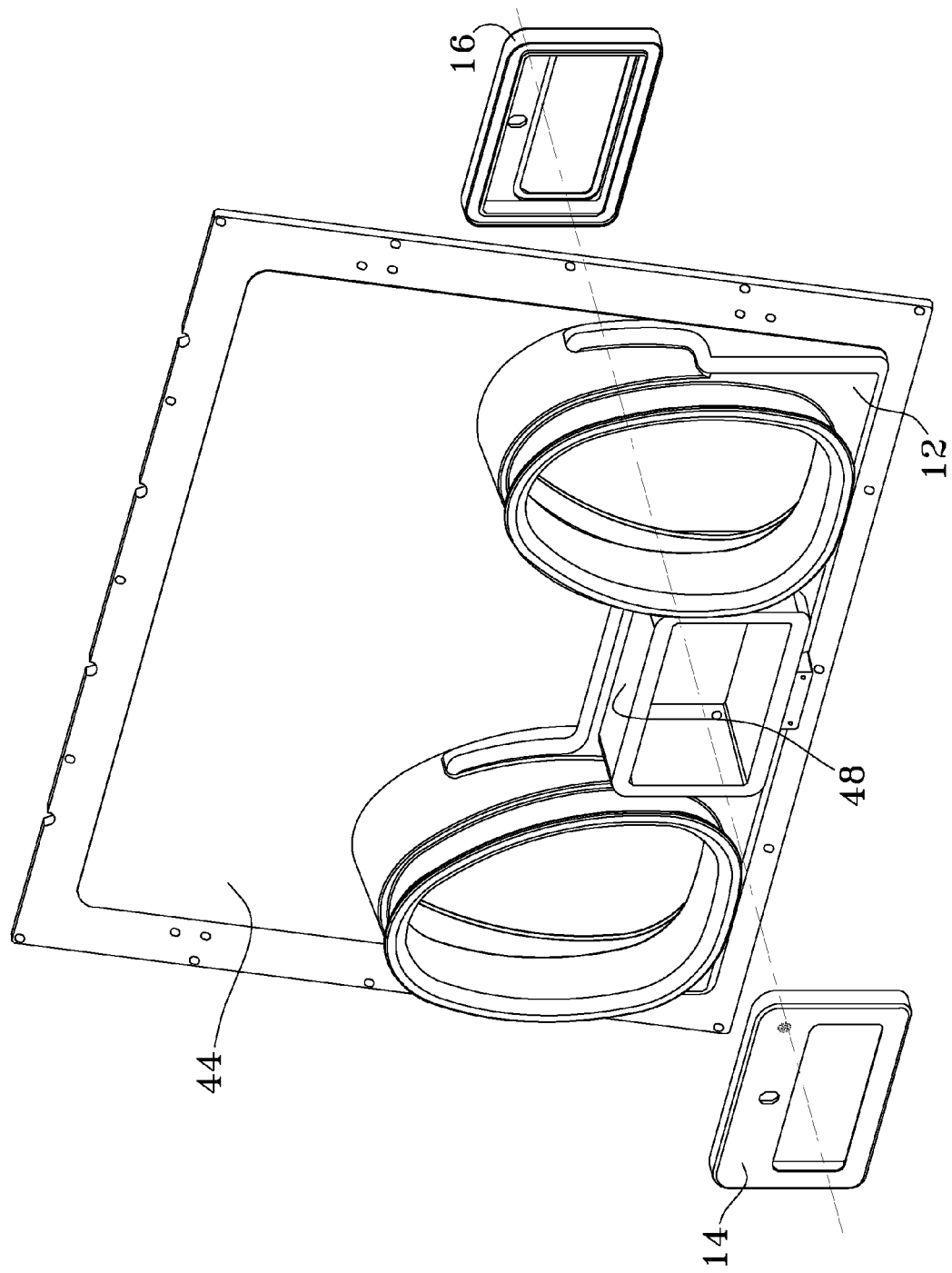
FIG. 10 is an exploded view of the arm portal and pass box assembly with the front panel of an incubator hood.
Figure 11:
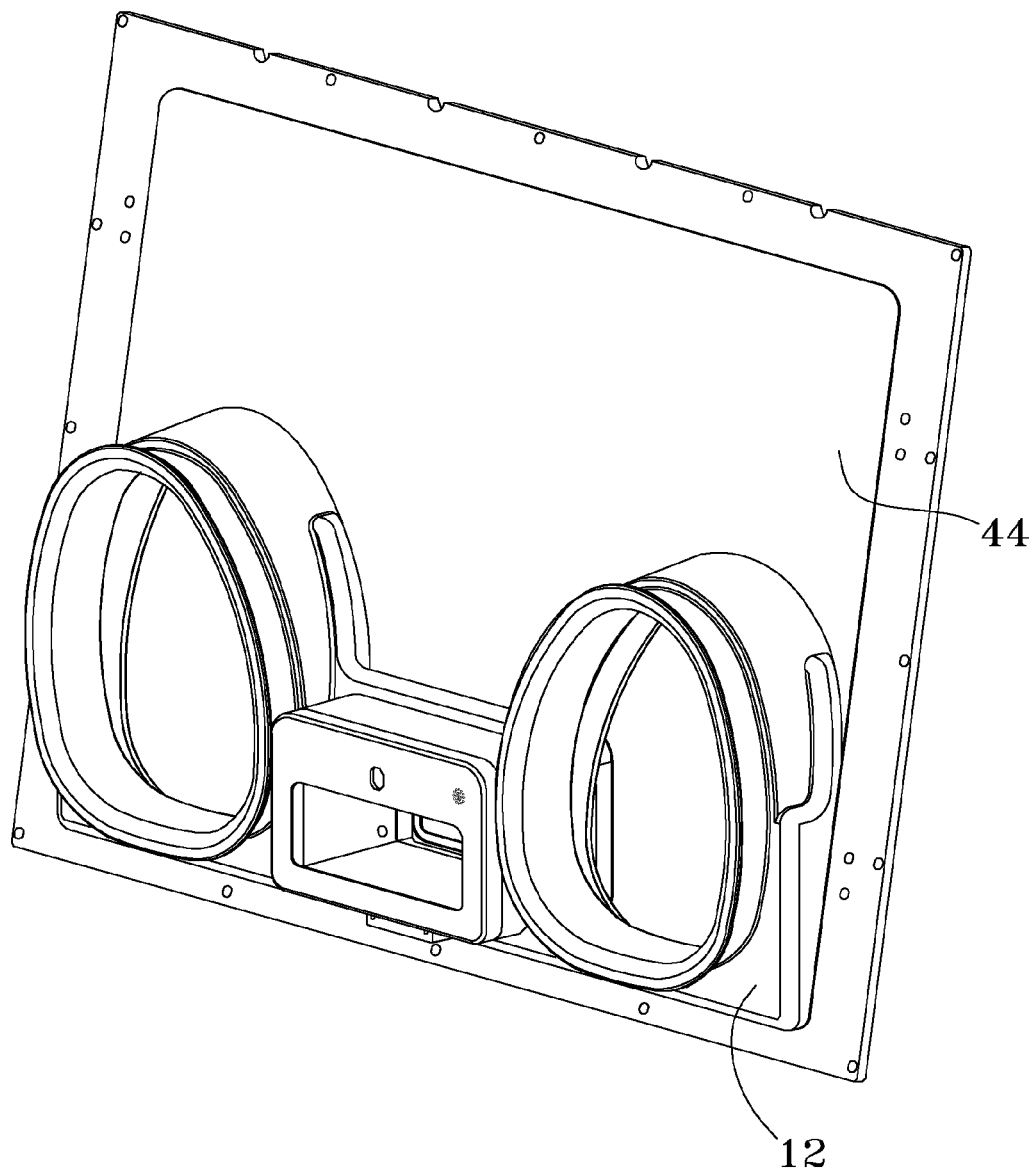
FIG. 11 is a perspective view of the arm portal and pass box assembly mechanically affixed to the front panel of an incubator hood.

The benefits and obvious advantages of the improved arm portal and pass box flange 10 are best explained in a description of the operation. Three openings are cut through a planar front transparent panel 44 (FIG. 11) to the approximate dimensions of the interior face of inner rings 27 and 28 as well as the inner cylinder walls of the pass box section 48 as illustrated in FIG. 9. A series of holes are drilled in the panel 44 that align with the mechanical connection orifices 46 of the improved arm portal and pass box assembly 10. A sealing gasket or material may optionally be placed between the flanged portion 38 of the portal body 12 and the panel 44 and an O-ring is placed in the O-ring groove 42 between the flanged portion 38 of the portal body 12 and the panel 44. Mechanical fasteners such a nuts and bolds are used to connect the panel 44 and the body 12, see FIGS. 10-11. The pass box front seal plate assembly 14 and pass box rear seal plate assembly 16 each have a elastomeric seal inserted into their groove 50 and 51 which are compressed to make a seal with the open ends of the pass box section 48. The front and rear pass box seal plates 14, 16 are attached to portal body 12 via hinge assemblies (not illustrated), that are connected to portal body 12 via hinge mounting holes 62 illustrated in FIGS. 4 and 8.

The shape of both the left and right arm portals were designed to have a almost flat bottom so that the user could comfortably rest his or her arms on the bottom of the arm portals. The lead in edge, or lip, of each arm portal has a large smooth radii so that the user can comfortably rest his or her arms. The arm portals will accommodate 10" diameter sleeves and are taller than they are wide in order to accommodate a user of smaller stature; enabling him or her to reach high shelves located at the back of the controlled environment/work space.

Additionally, the shape of the arm portals are angled outwards so that all users can easily reach the left and right walls of the controlled environment/work space, and are located as close to the pass box as possible so that the user can put his or her hands together and work directly in front of him/her on the work surface. This specific configuration of the arm portal and pass box assembly maximize the work space, creating the most efficient work area possible.

The pass box is sized for holding a stack of five large petri dishes, and contains windows in each door (front and back) for visibility. The height of the bass box is minimized to maximize visibility of the most efficient work area.

The above description will enable any person skilled in the art to make and use this invention. It also sets forth the best modes for carrying out this invention. There are numerous variations and modifications thereof that will also remain readily apparent to others skilled in the art, now that the general principles of the present invention have been disclosed. As such, those skilled in the art will appreciate that the conception, upon which this disclosure is based, may readily be utilized as a basis for the designing of other structures, methods and systems for carrying out the several purposes of the present invention.

It is important, therefore, that the claims be regarded as including such equivalent constructions insofar as they do not depart from the spirit and scope of the present invention.

Having thus described the invention, what is claimed as new and desired to be secured by Letters Patent is as follows:

1. An arm portal and pass box assembly for a controlled environment chamber comprising:
   a portal body comprising mechanical connection orifices formed therethrough a flanged portion of said portal body for said portal body's secure connection to a controlled environment chamber;
   a left-hand portal formed therethrough said portal body wherein said left-hand portal has a stepped left interior wall comprising a first inner section with a first inner diameter and a first outer section with a first outer diameter;
   a right-hand portal formed therethrough said portal body wherein said right-hand portal has a stepped right interior wall comprising a second inner section with a second inner diameter and a second outer section with a second outer diameter;
   a pass box formed thereon said portal body adjacent said right and left-hand portals;
   wherein said left-hand portal has no axis of symmetry and said right-hand portal has no axis of symmetry;
   a left single walled outer ring of uniform depth with a beveled exterior surface and front flange formed around its front edge; and
   a left double walled inner ring on non-uniform depth wherein said non-uniform depth increases from a bottom of said inner ring to a top of said inner ring and wherein only a back edge of said inner ring is tapered; and
   wherein said left single walled outer ring transitions together with said left double walled inner ring at an interface of the non-tapered front edge of said inner ring and the non-flanged rear edge of said outer ring.

2. The arm portal and pass box assembly of claim 1 wherein said right hand portal further comprises:
   a right single walled outer ring of uniform depth with a beveled exterior surface and front flange formed around its front edge; and
   a right double walled inner ring on non-uniform depth wherein said non-uniform depth increases from the bottom of said inner ring to the top of said inner ring and wherein only the back edge of said inner ring is tapered; and
   wherein said right single walled outer ring transitions together with said right double walled inner ring at the interface of the non-tapered front edge of said inner ring and the non-flanged rear edge of said outer ring.

3. The arm portal and pass box assembly of claim 1 wherein said right hand portal further comprises:
   a right single walled outer ring of uniform depth with a beveled exterior surface and front flange formed around its front edge; and
   a right double walled inner ring on non-uniform depth wherein said non-uniform depth increases from the bottom of said inner ring to the top of said inner ring and wherein only the back edge of said inner ring is tapered; and
   wherein said right single walled outer ring transitions together with said right double walled inner ring at the interface of the non-tapered front edge of said inner ring and the non-flanged rear edge of said outer ring.

4. The arm portal and pass box assembly of claim 3 wherein a left glove recess is formed on said beveled exterior surface of said left single walled outer ring between said front flange and said interface of the non-tapered front edge of said inner ring and the non-flanged rear edge of said outer ring and wherein a right glove recess is formed on said beveled exterior surface of said right single walled outer ring between said front flange and said interface of the non-tapered front edge of said inner ring and the non-flanged rear edge of said outer ring.

5. The arm portal and pass box assembly of claim 4 wherein said left-hand portal is a mirror image of said right-hand portal.

6. The arm portal and pass box assembly of claim 5 wherein said left-hand portal and said right-hand portal are comprised of arc segments from at least three different diameter circles.

7. The arm portal and pass box assembly of claim 6 wherein said flanged portion of said portal body extends from a rear back edge of said left stepped interior wall and from a rear back edge of said right stepped interior wall and extends around said pass box, forming a generally planar surface.

8. The arm portal and pass box assembly of claim 7 wherein a groove resides around said flanged portion of said portal body for the placement of a sealing mechanism.

9. The arm portal and pass box assembly of claim 8 wherein said pass box is a generally rectangular double walled cylinder open on both ends.

10. The arm portal and pass box assembly of claim 9 wherein said pass box further comprised a front seal plate and a rear seal plate.

11. The arm portal and pass box assembly of claim 10 wherein said front seal plate further comprises a front elastomeric seal groove formed about an inside perimeter and a front transparent panel mechanically affixed about a viewing orifice formed therethrough said front seal plate.

12. The arm portal and pass box assembly of claim 11 wherein said front seal plate further comprises a grouping of venting orifices formed therethrough said front seal plate and a lock mechanism orifice formed therethrough said front seal plate.

13. The arm portal and pass box assembly of claim 12 wherein said rear seal plate further comprises a rear elastomeric seal groove formed about an inside perimeter, and a rear transparent panel mechanically affixed about a rear viewing orifice formed therethrough said rear seal plate.

14. The arm portal and pass box assembly of claim 13 wherein said portal body further comprises mounting holes for the hinging connection of said front seal plate and said rear seal plate to said portal body.

* * * * *